United States Patent
Hoffeld (10) Patent No.: US 11,118,637 B2
(45) Date of Patent: Sep. 14, 2021

(54) MONITORING A HYDRODYNAMIC CLUTCH

(71) Applicant: Voith Patent GmbH, Heidenheim (DE)

(72) Inventor: Harald Hoffeld, Crailsheim (DE)

(73) Assignee: Voith Patent GmbH, Heidenheim (DE)

( * ) Notice: Subject to any disclaimer, the term of this patent is extended or adjusted under 35 U.S.C. 154(b) by 288 days.

(21) Appl. No.: 16/283,256

(22) Filed: Feb. 22, 2019

(65) Prior Publication Data
US 2019/0186555 A1 Jun. 20, 2019

Related U.S. Application Data

(63) Continuation of application No. PCT/EP2017/066743, filed on Jul. 5, 2017.

(30) Foreign Application Priority Data

Aug. 24, 2016 (DE) ..................... 10 2016 215 857.0

(51) Int. Cl.
*F16D 33/16* (2006.01)
*F16D 33/08* (2006.01)
(Continued)

(52) U.S. Cl.
CPC ............. *F16D 33/16* (2013.01); *F16D 33/08* (2013.01); *F16D 33/18* (2013.01); *F16H 41/24* (2013.01);
(Continued)

(58) Field of Classification Search
CPC .......... F16D 33/16; F16D 33/08; F16D 33/18; F16D 2500/10487; F16D 2500/3056;
(Continued)

(56) References Cited

U.S. PATENT DOCUMENTS

| 4,073,139 A | 2/1978 | Armasow et al. |
| 6,285,942 B1 * | 9/2001 | Steinmetz ............. F16H 61/061 192/109 F |

(Continued)

FOREIGN PATENT DOCUMENTS

| DE | 24 38 132 | 2/1975 |
| DE | 100 26 223 A1 | 10/2002 |

(Continued)

OTHER PUBLICATIONS

Notice of Transmission of the International Research Report and the Written Notice Issued the International Searching Authority or Declaration dated Nov. 8, 2017 for International Application No. PCT/EP2017/066743 (11 pages).

(Continued)

*Primary Examiner* — Freddie Kirkland, III (74) *Attorney, Agent, or Firm* — Taylor IP, P.C.

(57) ABSTRACT

A hydrodynamic clutch having an input side and an output side, the rotational motions of which are coupled to one another with a hydraulic fluid. A method for determining the degree of filling of the hydrodynamic clutch with fluid including steps of periodically sensing a fluid temperature of the hydraulic fluid, determining the thermal output supplied to the clutch on the basis of the temperature, determining a lambda value on the basis of the thermal output and determining the degree of filling on the basis of the lambda value.

8 Claims, 6 Drawing Sheets

(51) Int. Cl.
*F16D 33/18* (2006.01)
*F16H 41/24* (2006.01)
*F16H 61/478* (2010.01)

(52) U.S. Cl.
CPC . *F16H 61/478* (2013.01); *F16D 2500/10487* (2013.01); *F16D 2500/3056* (2013.01); *F16D 2500/5035* (2013.01); *F16D 2500/50296* (2013.01); *F16D 2500/5102* (2013.01); *F16D 2500/7101* (2013.01)

(58) Field of Classification Search
CPC ..... F16D 2500/5102; F16D 2500/5035; F16D 2500/50296; F16D 2500/7101; F16H 41/24; F16H 61/478
See application file for complete search history.

(56) References Cited

U.S. PATENT DOCUMENTS

| | | | | |
|---|---|---|---|---|
| 8,392,047 | B2 * | 3/2013 | Dreier | B60R 16/0234 |
| | | | | 701/29.1 |
| 8,843,289 | B2 * | 9/2014 | Postic | F16D 48/066 |
| | | | | 701/68 |
| 9,309,792 | B2 * | 4/2016 | Long | F16H 57/0434 |
| 10,634,199 | B2 * | 4/2020 | Ruiters | F16D 13/72 |
| 10,851,772 | B2 * | 12/2020 | Junginger | F04B 1/0421 |
| 2009/0308063 | A1 | 12/2009 | Schips | |
| 2012/0067690 | A1 * | 3/2012 | Postic | F16D 48/066 |
| | | | | 192/85.63 |
| 2012/0290249 | A1 * | 11/2012 | Hebbale | F16D 48/06 |
| | | | | 702/130 |
| 2013/0086896 | A1 | 4/2013 | Scherrle et al. | |
| 2014/0163845 | A1 * | 6/2014 | Otanez | F02D 41/0215 |
| | | | | 701/112 |
| 2018/0252276 | A1 * | 9/2018 | Ruiters | F16D 13/72 |

FOREIGN PATENT DOCUMENTS

DE 101 29 072 A1 12/2002
DE 10 2004 048 649 A1 4/2006

OTHER PUBLICATIONS

German Office Action dated Jun. 1, 2017 for German Application No. 10 2016 215 857.0 (12 pages).

\* cited by examiner

MONITORING A HYDRODYNAMIC CLUTCH

CROSS REFERENCE TO RELATED APPLICATIONS

This is a continuation of PCT application No. PCT/EP2017/066743, entitled "MONITORING A HYDRODYNAMIC CLUTCH", filed Jul. 5, 2017, which is incorporated herein by reference.

BACKGROUND OF THE INVENTION

1. Field of the Invention

The present invention relates to a hydrodynamic clutch, and in more particularly to monitoring of a hydrodynamic clutch.

2. Description of the Related Art

A hydrodynamic clutch is configured to transfer torque between an input side and an output side. For this purpose, the input side is connected with a pump wheel and the output side is connected with a turbine wheel, wherein the impeller and the turbine wheel are coupled with one another via a hydrodynamic fluid. If the clutch is operated with slippage, for example during ramping up so that the output side rotates at a different speed than the input side, the fluid is heated. If the temperature of the fluid exceeds a predetermined value, the load of the working machine must be reduced or if this is not possible, the clutch must be brought to a standstill and cooled down.

A known method predicts an anticipated temperature change on the basis of a temperature of such a clutch in the event of a load change. Consequently, an alert or a stop signal can be provided to avoid a thermal overload.

However, the temperature as a parameter of an operational condition of the hydrodynamic clutch is oftentimes insufficient for a determination of the efficiency or stability of the clutch or respectively the drive.

SUMMARY OF THE INVENTION

The invention in one form is directed to a hydrodynamic clutch including an input side and an output side, the rotational motions of which are coupled to one another with a hydraulic fluid. The invention is also directed to a method for determining the degree of filling of the hydrodynamic clutch with fluid. The method including steps of periodically sensing a fluid temperature of the hydraulic fluid, determining the thermal output supplied to the clutch on the basis of the temperature, determining a lambda value on the basis of the thermal output and determining the degree of filling on the basis of the lambda value. This determination is especially advantageous for a clutch with constant fluid filling. Incorrect filling, leakage or a calculated loss can be determined and monitored.

The thermal output in the above method can be determined in particular on the basis of a mechanical power that is transferred via a clutch. Determining the mechanical power may include steps of determining a maximum permissible temperature of the clutch, determining an ambient temperature of the clutch and determining the power that is being transferred via the clutch on the basis of the fluid temperature and the ambient temperature. The maximum transferred power may depend upon non-variable parameters or permanent properties of the clutch, so that it may be determined only once. The transferred power can thus be determined simply and reliably. A prognosis of a maximum transferable power or a maximum time period of the transfer of a predetermined power can be facilitated. The determined transferred power can be the basis for determination of additional, herein referred to parameters.

In other embodiments, additional parameters of the clutch can furthermore be determined. All parameters may be determined on the basis of the determined temperature. Using several parameters, the operating status of the clutch can be better specified or predicted. The operating status can in particular indicate a current load, a current load capacity or wear and tear that has already occurred. Depending on the determined operating status, planning of scheduled maintenance intervals can be improved. Improved maintenance intervals can be established in such a way that components which need to be renewed can be replaced early enough, as to avoid reduced efficiency or defects, but at the same time can be long enough to ensure the serviceability of the clutch and to save on costs. By adhering to the established maintenance intervals, the clutch can again be brought into a condition of full efficiency, wherein the original efficiency can again be attained. Establishing the parameters can take into account performed maintenance on the clutch.

In one embodiment, a remaining life span is moreover determined. The method thereby includes additional steps of determining loads on the fluid for the sensed temperatures, determining a sum of the loads and determining the remaining life span on the basis of the sum. A soon to be occurring maintenance interval for the fluid can thus be determined simply and reliably. A reduction of the efficiency of the fluid determined on the basis of the thermal load on the fluid. The thermal load can reflect the mechanical load of the fluid in a sufficiently good approximation, so that a realistic assessment can be made.

Moreover, a remaining life span of an antifriction bearing for mounting of the input side relative to the output side can be determined, wherein the method includes additional steps for determining loads on the antifriction bearing on the basis of the sensed temperatures determining a sum of the loads and determining the remaining life span on the basis of the sum. The cumulative wear and tear on the antifriction bearing can be understood in a good approximation on the basis of the temperature.

When determining the remaining life span of the antifriction bearing, a frequency of starts can be considered. Starting, in other words an increase in the speed differential of the antifriction bearing from standstill to a rated speed substantially shortens the life span. The frequency of starts can be related to the life span up to the present or a frequency of start processes within a predetermined time period can be considered. Assessment of the remaining life span can thus be clearly improved.

In determining the remaining life span, slippage between the input side and the output side of the antifriction bearing could moreover be considered. This can occur through speed measurement on the output side of the clutch or possibly on input and output side. The greater the slippage, the greater is the demand on the antifriction bearing, so that the remaining life span decreases all the faster the more often or longer the clutch is operated with high slippage.

Generally, the determination can relate to several antifriction bearings on which the input side or output side are mounted respectively. The determination then includes all antifriction bearings as a bearing set. Once the limit of the life span of one antifriction bearing is reached, all antifriction bearings of the affected bearing set are usually replaced.

The described parameters may be established in combination together. For example, after an optional initialization, a continuous loop can be periodically cycled through in predetermined time intervals. The individual parameters can be established for different frequencies, so that not all parameters are defined in each cycle. A parameter can also be determined event-driven. If a prespecified event occurs, the parameter can be determined during the next cycle through the loop. Otherwise the determination can be foregone. Recording of measured values, especially sensing of the temperature of the fluid may be performed consistently for the determination of all parameters. The determination of one parameter can be based on the determination of another parameter. The other parameter can thereby also be determined through another method than the one described herein, perhaps through direct measurement or use of a physical model which is not explicitly referred to herein.

A computer program product includes program code to implement the method described above if the computer program product runs on a processor or is stored on a computer-readable data medium.

A control unit for determining an operating status of the hydrodynamic clutch described above includes an interface for connection with a temperature sensor which is equipped for periodic sensing of the temperature of the hydraulic fluid. The control unit also includes a processor arranged for determining a thermal output supplied to the clutch on the basis of temperature sensing, determining a lambda value on the basis of the thermal output, as well as determining the degree of filling on the basis of the lambda value. The processer can include a programmable microcomputer or microcontroller and can be arranged to perform at least part of the aforementioned computer program product. The processor can be integrated with the clutch. The processor can moreover be arranged to control a drive motor which is connected with the input side or with a machine which is connected with the output side.

In another embodiment, the processor is arranged to issue a warning in the event that one of the defined parameters indicates a critical operating status of the clutch. In particular, from the entirety of the parameters that reflect the operating status, an imminent danger can be identified. For example, two or more of the parameters respectively may be within predetermined limits, in combination however, they may point to a critical operating condition of the clutch.

Another embodiment includes a hydrodynamic clutch having an input side and an output side, the rotational motions of which are coupled with one another by a hydraulic fluid, a temperature sensor for period sensing of a temperature of the hydraulic fluid and the control unit described above. The clutch system can be self-contained and can facilitate transfer of torque with simultaneously improved monitoring of an operational status.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
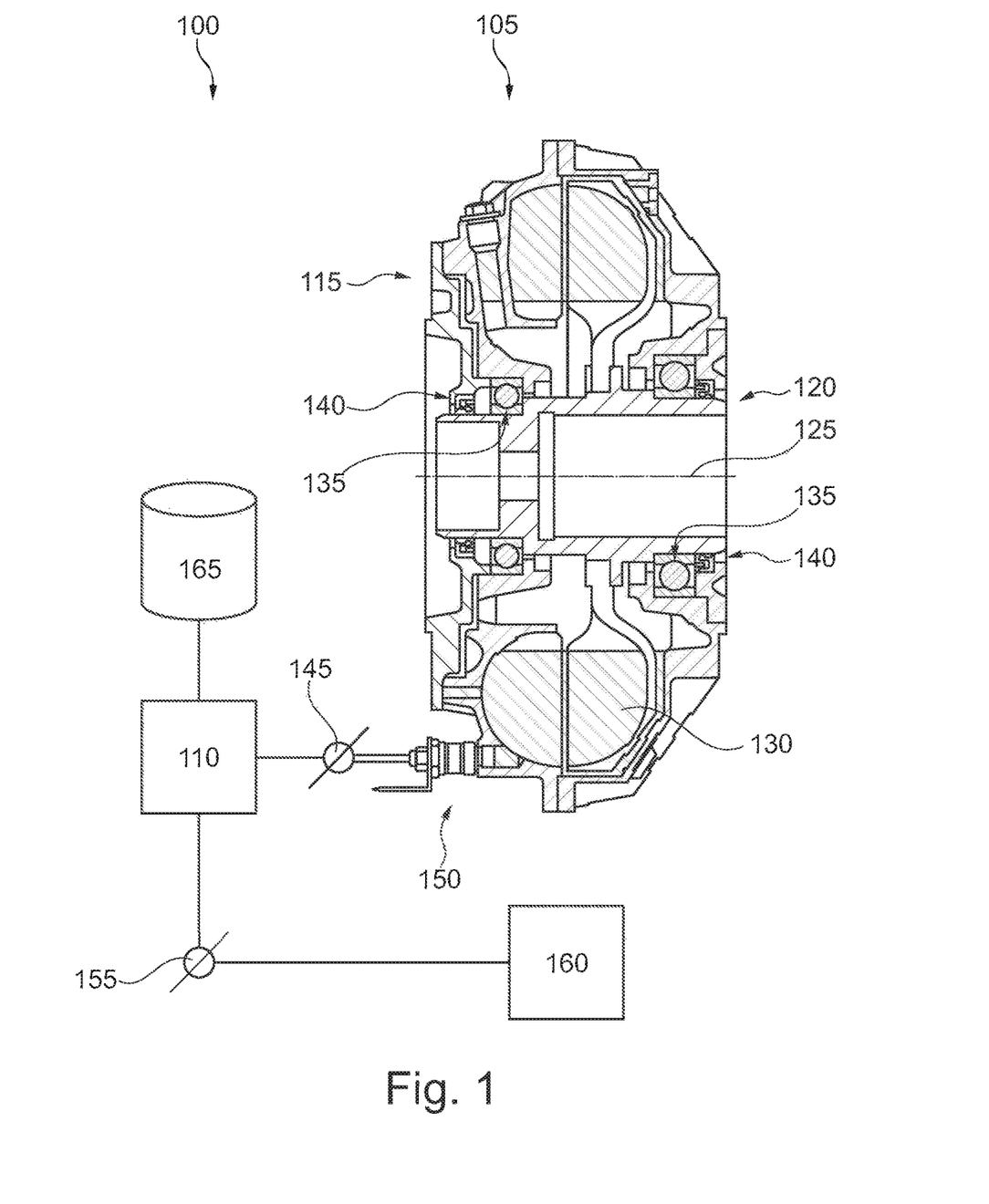
FIG. 1 a schematic depiction of a clutch system having a hydrodynamic clutch.

Referring now to the drawings, and more particularly to FIG. 1, there is shown a clutch system 100 having a hydrodynamic clutch 105 and a control unit 110. Clutch 105 has an input side 115 and an output side 120 which together are rotatably mounted around a common axis of rotation 125. A hydraulic fluid 130 produces a torque coupling between input side 115 and output side 120. Input side 115 is mounted opposite to output side 120 with at least one antifriction bearing 135. Depending upon a clutch type, the connections for introduction and termination of torque loads on the antifriction bearings 135 can vary, even if their arrangement is unchanged. One or more seals 140, which can include various materials, can be provided between input side 115 and output side 120.

Clutch 105 may be available in one or several predefined embodiments. Clutch system 100 can for example be used with clutches 105 having different, predetermined diameters in a range of approximately 154 to 1150 mm. Each of these clutches 105 can be configured for transfer of a predetermined maximum power within a predetermined torque range. The power can for example be in a range of approximately 100 W to approximately 5 MW, and the torque in a range between approximately 300 and 4000 min$^{-1}$. Clutches 105 can also be available in different embodiments, for example with or without housing, with single or double pump wheel-turbine wheel arrangement or with different types of equalizing chambers for temporary storage of fluid 130. Each clutch 105 can therein have specific characteristics, for example a thermal reaction in answer to a predetermined load.

Certain predefined parameters or their intermediate values can be saved and/or be graphically processed. Thus, a trend of a parameter can for example be visualized at any given time. In another embodiment, one or several parameters can be compared with threshold values and when falling below or exceeding the threshold value a signal can be issued. A signal can also be issued based on logical interlinking of several conditions. The signal not only points to a certain condition, for example an imminent excessive temperature of clutch 105, but also to a suggested solution, for example shutting off the drive motor that is connected with input side 115 or reducing the load through the working machine that is connected with the output side.

A predetermined volume of fluid 130 is typically filled into clutch 105, wherein fluid 130 during operation is circulated. However, the fluid 130 normally does not leave clutch 105, for example in order to flow through a heat exchanger. One also refers to a constant filling in this instance. Fluid 130 normally consists of a mineral or synthetic oil, but may be provided on a water basis, for example when using clutch 105 in an explosive environment.

Control unit 110 has a first interface 145 for connection with a temperature sensor 150 that is configured for sensing the temperature of hydraulic fluid 130 in clutch 105. Temperature sensor 150 may be designed for non-contact temperature measurement in order to provide the temperature of fluid 130 flowing around axis of rotation 125, outside of clutch 105 which rotates around axis of rotation 125 during operation. However, one or several additional sensors can be provided to sense a measured value on clutch 105. The measured value can however also be provided with another device, for example a control or measuring device. In this case, the measured value can also be acquired via interface 145 or a dedicated interface of control unit 110.

Control unit 110 is configured to identify an operating status of clutch 105, wherein the operating status includes several parameters, each of which can be identified on the basis of the temperature of hydraulic fluid 130. The control unit 110 may include a second interface 155, in order to supply the identified operating status or other information, in particular to a terminal device 160. Control unit 110 can include a memory device 165, or can be connected with same, wherein storage device 165 can be configured to store sensed measured values, determined parameters or other identified results. Moreover, constants, characteristic curves or other information which are specifically for determination of a parameter for a predefined clutch 105, for example a thermal behavior of clutch 105 in response to a predefined load, can be stored in memory device 165.

Terminal device 160 can be arranged for interaction with a person, for example in that one or several parameters of the operating status can be indicated. Terminal device 160 can also be used for control of control unit 110, perhaps to call up predetermined stored parameters or in order to influence the identification of the parameters. In another embodiment, terminal device 160 can also include a control unit that is arranged for control of clutch 105, control of a component driving clutch 105 or control of a component being driven by clutch 105. Depending on the operating status, terminal device 160 can in particular be arranged to limit or stop a transfer of torque via clutch 105. In another embodiment, the control function can also be performed by control unit 110.

Below, exemplary identifications of parameters are discussed, several of which can be included in the operating status of clutch 105. It must be considered that the individual methods for determining of parameters are conducted simultaneously or more specifically, concurrently. An initialization step that may be necessary for several of the methods can be integrated cross-procedurally into one step. In the initialization step several values or data can be provided, for example by manual input.

The methods respectively include continuous loop to cyclically perform their determinations. The continuous loops may be integrated with one another, wherein the frequency of the steps of the individual methods within the loop need not necessarily be the same. One loop may cycle through every approx. 5 s to 10 s. The step of sensing the temperature of clutch 105 is common to all methods. Certain parameters of the described methods can build on one another, for example in that an aging of fluid 130 is determined on the basis of a power that is transferred via clutch 105. The sequence of the steps in the continuous loop is thus to be selected accordingly. Under certain circumstances, for example if one component of clutch 105 undergoes maintenance or is replaced, parameters of one or of several methods are reset to initial values.

Figure 2:
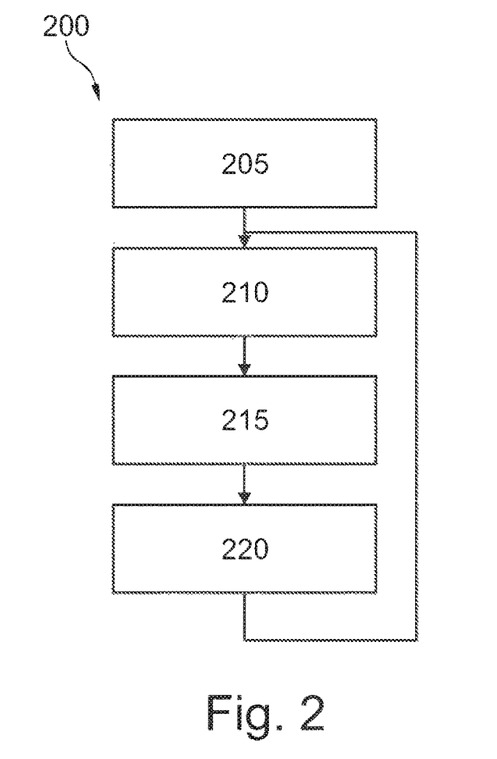
FIG. 2 a flow chart of a method for determining a current filling of the hydrodynamic clutch with fluid.

FIG. 2 shows a flow chart of a method 200 for determining a current filling of hydrodynamic clutch 105 with fluid 130. In an initialization stop 205, a type of clutch 105 may be determined. Subsequently a loop of steps 210 to 220 is cycled through periodically, for example approximately every 5 or 10 seconds.

In step 205 the temperature of fluid 130 of clutch 105 is determined. A determination of power P that is transferred via clutch 105 occurs in a step 210.

$$P = A \cdot \Delta\theta / \Delta t \cdot \text{effective thermal capacity of the clutch}$$

The effective thermal capacity of the clutch is again a function of the rate of heating. The effective thermal capacity of the clutch on the one hand includes a component that stems from the thermal capacity of the clutch, and on the other a component that stems from the thermal capacity of the fluid in the clutch.

The following applies: $\Delta\theta/\Delta t$: maximum value of the measured/calculated rate of heating during the first 5 s after motor start (conditions for motor start: $\Delta\theta/\Delta t > 0.5$ K/s and the speed of the clutch n2 is or respectively was zero in time period 10 s prior). In consideration of the respective fill level in the clutch, the thermal capacity of the clutch and the thermal capacity of the fluid flow into the effective thermal capacity of the clutch.

In a subsequent step 215, the lambda value $\lambda_A$ is determined on the basis of the transferred power:

$$\lambda_A = \frac{P}{\rho_{Fluid} \cdot D_P^5 \cdot \omega_1^2 \cdot z}$$

where:
P: supplied thermal output
$P_{Fluid}$: density operating medium (Oil: 840 kg/m3; Water: 980 kg/m3)
$D_P$: profile diameter [m]
$\omega 1$: $n_N * \pi$: wherein only $n_N$ over n2 and a table or data bank are determined
z: number of cycles. If one pump wheel and one turbine wheel are provided, then z=1;
if respectively two are provided which are coupled in pairs, then z=2.

The fill level is a function of $\lambda_A$, clutch type, clutch diameter and hydrodynamic profile.

Figure 3:
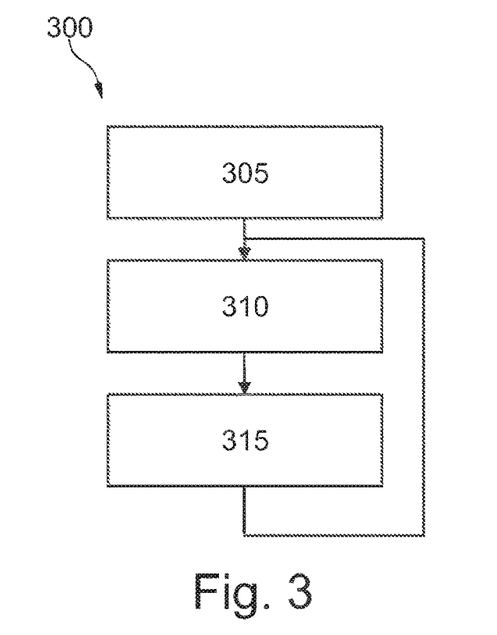
FIG. 3 a flow chart of a method for determining a current filling of the hydrodynamic clutch.

If clutch 105 is in stationary operation, another method can also be selected for determining the current fill of a hydrodynamic clutch 105 with fluid 130.

FIG. 3 shows a flow diagram of a corresponding method 300. Rated speed $n_N$ is determined in an initialization step 305. This can be performed on the basis of the steady speed $n_2$ by use table, so that for example 1458 min$^{-1}$ to 1490 min$^{-1}$ are mapped. Subsequently a loop of steps 310 to 315 may be cycled through periodically, for example approximately every 5 or 10 seconds. In step 310, temperature $\theta_{VTK}$ of fluid 130, temperature $\theta_{amb}$, and speed $n_2$ of clutch 105 are determined.

In step 315 a fill loss of clutch 105 is determined. The determination is made on the basis that the power that is transferred via clutch 105 is $P\sim\Delta\theta^C$ and that moreover $P\sim m\cdot s$ applies. Thereby, c is a number m is the increase of the rated slippage line.

Thus, the following applies:

$$\frac{\Delta\vartheta^c}{s} = \frac{\Delta\vartheta^c}{\left(1 - \frac{n_2}{n_N}\right)} = k\cdot m = const.$$

If clutch 105 leaks, then the quotient described above is no longer on this line. This criterion can be utilized for determining a leakage. Factor k·m may be defined when the temperature $\theta_{VTK}$ of fluid 130 is already at steady state. This is the case for example if condition $$\frac{\Delta\vartheta}{\Delta t} < 0.01\frac{K}{s}$$

is fulfilled for at least approximately 10 minutes. This will eliminate that temperatures that are too high from ramping up of the clutch 105 are being captured. Cyclical load fluctuations with constant temperature $\theta_{VTK}$ of clutch 105 can however be captured. It is assumed that, during a load change the load speed changes sinusoidally.

If the above condition is met, a value that contains for example approximately 100 values may be loaded into a FIFO memory.

For $n_2$, when saving, the mean value of the last 10 minutes must be used. A mean value for k*m can then be created from this FIFO-memory.

In stationary operation, that is in steady state, the filling loss can then be detected as follows:

$$\frac{\Delta\vartheta^c}{\left(1 - \frac{\phi n_2}{n_N}\right)} < 0.75\cdot(\phi k\cdot m)$$

The following applies:
m: increase of rated slippage line
ø$n_2$: mean value of output speed over approx. last 10 minutes
(øk·m): average of last approx. 100 values of (k·m)

The factor of 0.75 results from that the difference of the increase in the constant filling normally is no greater than 25%. A modified factor can be used in other embodiments, to present a given clutch 105 in an improved manner.

If a reduced fill level was determined, a signal can be issued accordingly. The signal may be issued only when the fill level falls below a predefined threshold value.

In step 210 in the above described method 200, the thermal output introduced into clutch 105 is determined on the basis of the mechanical power that is transferred via clutch 105. The mechanical power can be measured or can be determined by a process.

Figure 4:
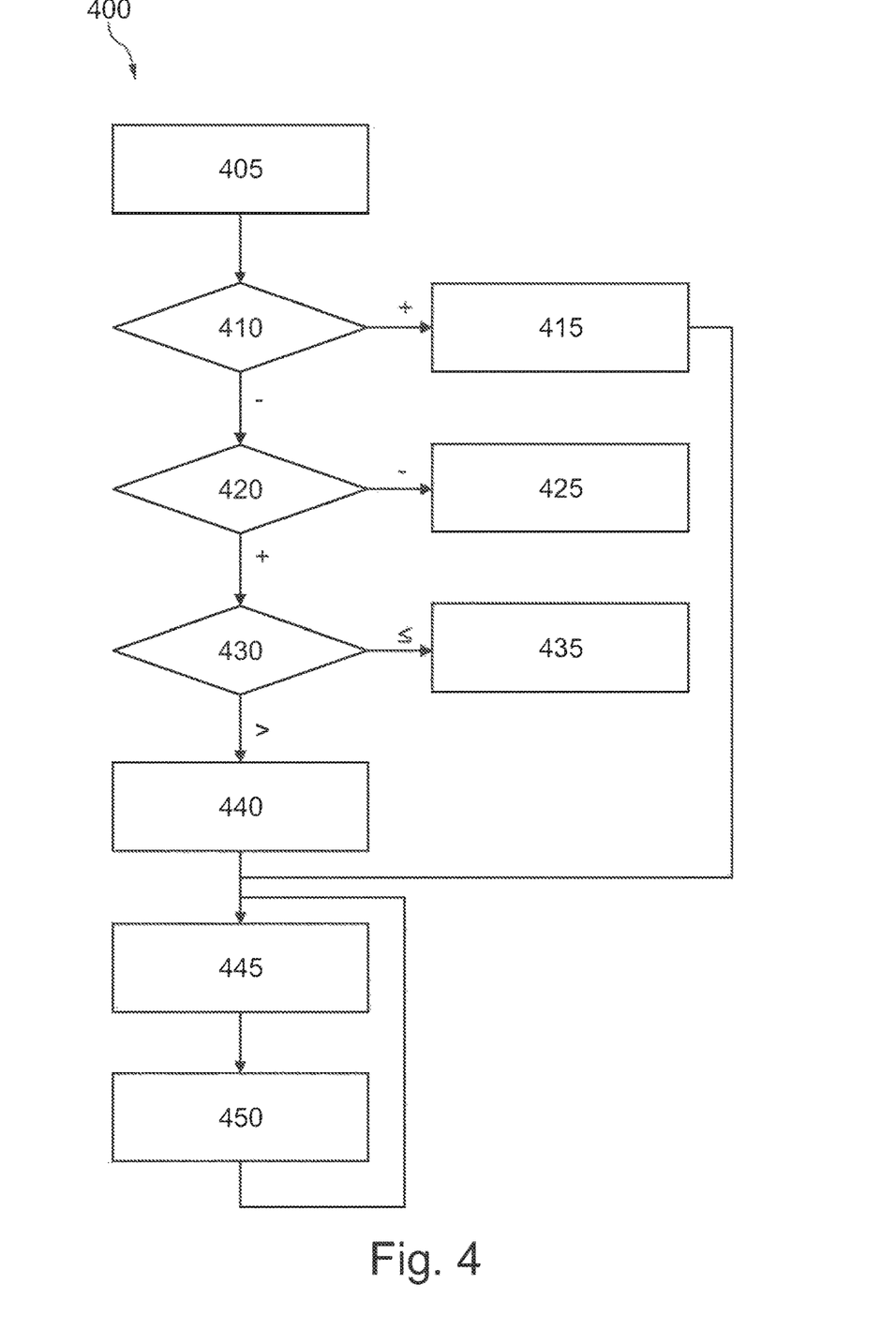
FIG. 4 a flow chart of a method for determining power transferred via the hydrodynamic clutch.

FIG. 4 shows a flow diagram of a method 400 for determining a power that is transferred via a hydrodynamic clutch 105. Method 400 can in particular be performed integrated with method 200 shown in FIG. 2. In an initialization step 405, at least one of the following must be provided: maximum operating temperature $\theta_{max}$ of clutch 105, one dimension of clutch 105, e.g. its diameter or one known clutch type, one operating medium and one statement of whether seal 140 consisting of the material Viton is used.

Normally, oil and water are considered for operating media. The operating medium is analyzed in a step 410. In the case of water, $\theta_{B,max}$ is set to a predefined ° C.-value in a step 415, and method 400 continues with a step 445. Otherwise it is determined in a step 420 as to whether Viton is used as the material for seals 140. If this is not the case, a seal material such as NBR is assumed and $\theta_{B,max}$ is set to a predefined ° C.-value in a step 425. The method subsequently continues with step 445. If in contrast, Viton is used, then $\theta_{B,max}$ can be determined on the basis of the clutch size. In a step 430 it is determined whether the clutch diameter falls short of a predefined clutch diameter. In that case, $\theta_{B,max}$ is preferably set to a predefined ° C.-value in a step 435. For clutches 105 that have a larger diameter, $\theta_{B,max}$ can be set to another predefined ° C.-value. Method 400 continues in both cases with step 445.

In step 445, temperature $\theta_{VTK}$ of fluid 130 of clutch 105 and temperature $\theta_{amb}$ of the surrounding area of clutch 105 are sensed. In a subsequent step 450, the relative power transferred by clutch 105 is determined as follows:

$$P_{Load.relative} = \left(\frac{\vartheta_{VTK} - \vartheta_{amb.}}{\theta_{amb.B.max}}O^c\right)$$

If, for example the clutch temperature is $\theta_{VTK}=78°$ C., the ambient air temperature $\theta_{amb.}=31°$ C. and $\theta_{B,max}=95°$ C., then the relative load is:

$$P_{Load.relative} = \left(\frac{78-31}{95-31}\right)^c = 0.734^c$$

In an additional embodiment, the absolute power can be determined on clutch 105 instead of the relative power:

$$[kW]P[kW]=\lambda*\rho_{Fluid}*\omega_1^3*D_P^5*z$$

where:
Dp: profile diameter
$\omega_1$: =$n_N$
z: number of cycles. If a pump wheel and a turbine wheel are provided, them z=1, if respectively two are provided, then z=2.
$\lambda$=m*s
m: increase of rated slippage line The increase of the rated slippage line m can only be determined inaccurately, due to varying possible heat dissipation, so that the output cannot be determined very precisely. In an alternative embodiment, a stored rated slippage line can be used that can be selected from a group of rated slippage lines on the basis of an input of an exact filling of clutch 105 with fluid 130. However, the nominal slippage line normally has a deviating progression, so that due to the approximation of a constant increase, a substantial error could be entered into the determination. Moreover, additional errors (for example the viscosity of fluid 130) could further compromise the determination.

For further improved control of clutch 105, additional parameters can be determined. It is in particular suggested, to determined parameters that point to a remaining life span of elements, such as fluid 130 or a bearing 135.

Figure 5:
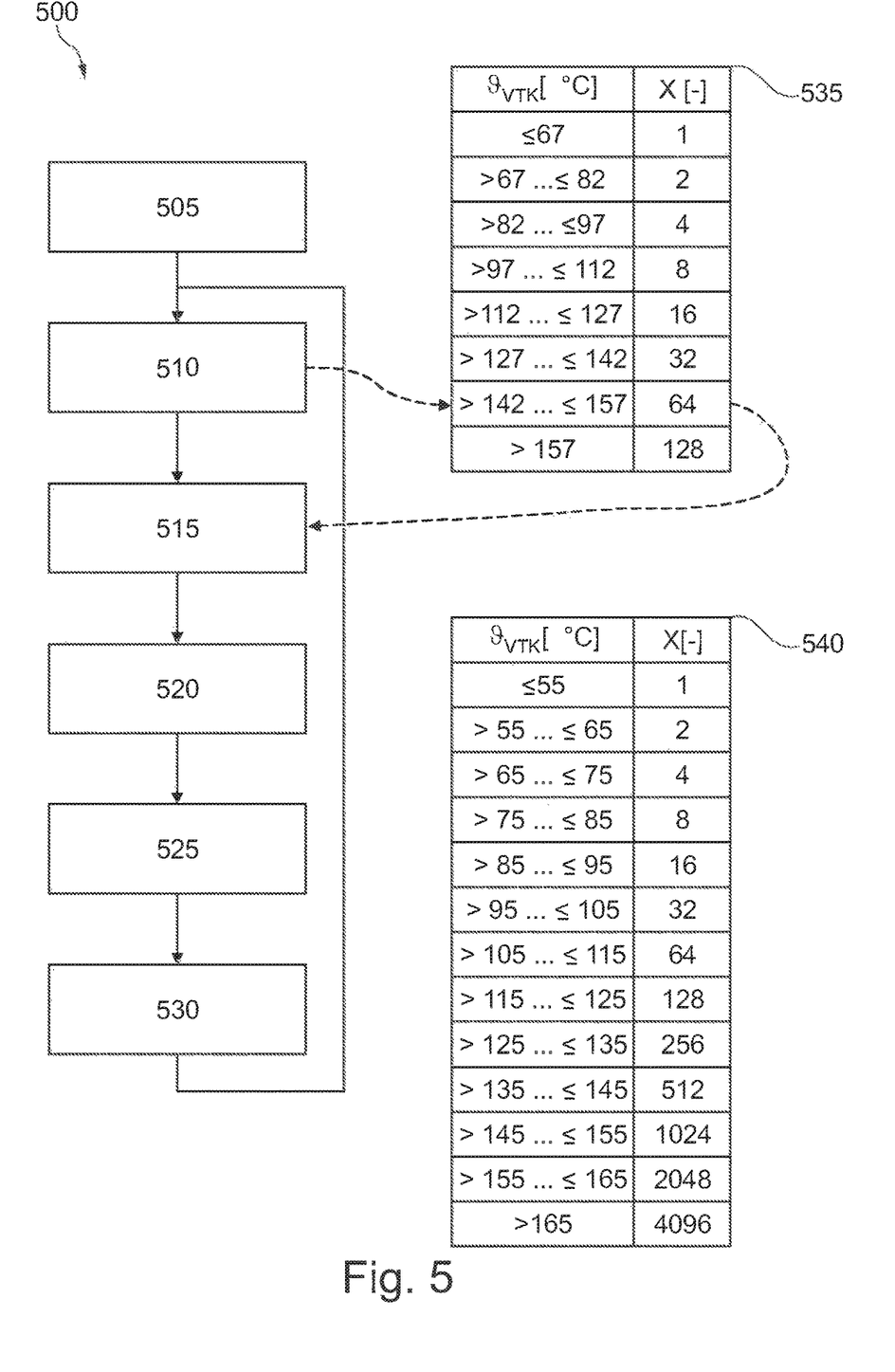
FIG. 5 a flow chart of a method for determining a remaining life span of the fluid in a hydrodynamic clutch.

FIG. 5 shows a flow diagram of a method 500 for determining a remaining life span of fluid 130. In an initialization step 505 the type of fluid 130 is determined.

Normally, an operator will input an appropriate value into a terminal device 160. Internal counters and analyzers of method 500 which are described in further detail later, may be reset in step 505. Step 505 must generally always be performed after filling of fresh fluid 130 into clutch 105.

Subsequently a loop of steps 510 to 530 is periodically cycled through, for example every 10 seconds. In step 510, temperature $\theta_{VTK}$ of fluid 130 of clutch 105 is sensed. Subsequently a current load value is determined in step 515. For this purpose, a certain temperature may be looked up in a table 535 or 540 which is then multiplied with the length of the interval between two measurements. In one embodiment, the exemplary table 535 is used if fluid 130 includes synthetic oil according to initialization step 505, and exemplary table 540 is used if it includes mineral oil. If fluid 130 is water, the determination in regard to life span can be suspended.

For example, at an interval of $\Delta t$ of 10 seconds, a determined temperature $\theta_{VTK}$ of synthetic fluid 130 of 148° C. leads to a table value of 64, so that the current load value is 10 s*64=640 s.

In step 520, current load values which are determined in n loop cycles since last initialization step 505 are added up. The degree of utilization k of fluid 130 is the determined in step 525, for example:

$$k = \frac{\sum_{i=0}^{n} X_i \cdot \Delta t}{40000h}.$$

Remaining time $t_{rem.fluid}$ can then be determined:

$$t_{rem.Fluid} = n \cdot \Delta t \cdot (1/k - 1)$$

In the case of k<1, the maximum life span of fluid 130 has not yet been reached. Otherwise, an indication in regard to the elapsed life span of fluid 130 can be issued in step 530.

Figure 6:
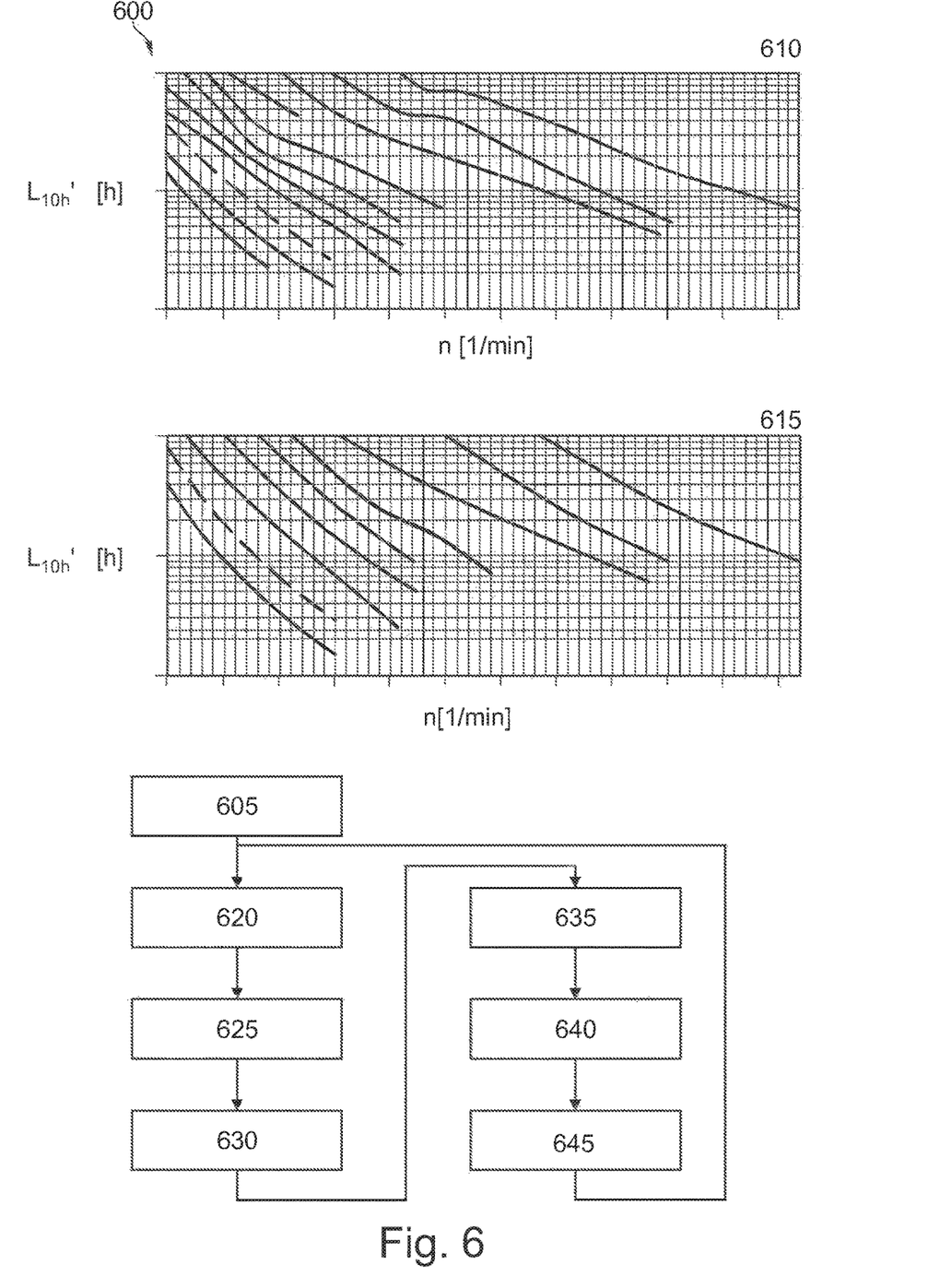
FIG. 6 a flow chart of a method for determining a remaining life span of an antifriction bearing in a hydrodynamic clutch.

FIG. 6 shows a flow diagram of a method 600 for determining a remaining life span or respectively degree of utilization of antifriction bearing 135. In an initialization step 605, at least one of the following must be determined: the size of clutch 105, on the basis of its diameter or a known clutch type, a rated speed $n_N$, a connecting coupling type, a type of antifriction bearing 135 and an event probability. The connecting coupling type can describe how connections on input side 115 and output side 120 are configured. Clutch 105 may for example be configured such that its weight is distributed to its input side 115 and its output side 120 when axis of rotation 125 is positioned horizontally (design "GPK"). Other embodiments are also conceivable. The type of antifriction bearing 135 may for example indicate if it is a bearing that is sealed on one side or on both sides, which is perhaps designed to be continuously running or whether it is perhaps a bearing having increased bearing clearance.

A nominal event probability $L'_{10h}$ is dependent on the clutch type and the clutch diameter. In stored tables, as sketched for example in FIG. 6 in 610 and 615, event probabilities are stored which can be selected depending on a clutch diameter from a characteristic curve of a first diagram 610 or a second diagram 615.

First diagram 610 relates to clutches 105 of type EPK, ENK or EEK. These clutches have classic plug connection with elastomer elements which elastically absorb shifting misalignment in elastomers. The hub of VTK is for example mounted on the transmission shaft and the installation and operation related misalignment are elastically "bridged"/absorbed. Depending on the elastomer characteristic curve, reset forces occur between the clutch locations that support themselves on the VTK mounts.

Second diagram 615 relates to clutches of type GPK (all metal package clutch). This clutch has VTK clutch with gimbal mount between two joints. These joints include mutually screwed together spring steel toroidal disc packages as elastically deformable elements. A GPK clutch displaces itself only angularly and axially in each of the two clutch elements 115, 130 and is very rigid in radial direction and direction of rotation. Reaction forces resulting from the displacement of GOK elements are very minimal.

Both diagrams 610, 610 are based on a clutch 105 with constant filling of fluid 130 (identification T). The curves illustrated in diagrams 610 and 615 are each allocated to certain diameters of clutches 105 and can be part of the type identification.

Subsequently a loop of steps 620 to 645 may be cycled through, periodically, for example every 5 seconds. In step 620, temperature $\theta_{VTK}$ of fluid 130 is determined. In subsequent step 625 a temperature factor $f_{Temp}$ is determined on the basis of the temperature.

$$f_{Temp} = \frac{1}{j \cdot \sqrt{1/\vartheta_{VTK}}}$$

A start up frequency can be considered in that in step 630 a time ratio of the start frequency is determined for example as follows:

$$w = \frac{\text{operating time start}}{\text{operating tine total}}$$

wherein the operating time "start" is counted if speed $n_2$ on output side 120 is below a predetermined threshold value, for example $0.87*n_N$. Otherwise the operating time is counted as total. Subsequently start frequency factor $f_{start}$ can be determined in step 635. This can be determined on the basis of calculated values which are stated in the form of a dime-dependent curve.

The curve can be determined in that the bearing life span for a start-up time is described, bearing life spans for longer start-up times are determined, the lifespans for the formation of factors to describe the reduction are used and the factors are described in a time dependent manner by a polynomial, for example of the sixth degree.

In step 640 a slippage of clutch 105 may be considered. For this purpose a slippage factor $f_{slippage}$ is determined:

$$f_{Slippage} = \begin{cases} s < 2\% \to f_{Slippage} = 1/l \\ 2\% \leq s \leq 4\% \to f_{Slippage} = \frac{1}{fs(s)} \\ s > 4\% \to f_{Slippage} = 1/b \end{cases} \text{ with } s = \left(1 - \frac{n_2}{n_N}\right) \cdot 100$$

l and b are predefined values and $f_s$ is a function in dependency on s.

In step 645 the load on antifriction bearing 135 can then be determined as follows:

$$f_{current} = 5s \cdot f_{Temp} \cdot f_{Start} \cdot f_{Slippage} \cdot a_1 \cdot a_{23}$$

Where:

a1: Factor for event probability a23: Factor for viscosity dependency

The basis in the described example is a periodic determination every 5 s in other embodiments a more or less frequent determination may occur. The above referenced factors are then to be adapted accordingly. Should one of the factors described above (in regard to temperature, start frequency or slippage) not be obtained it can be made on the basis of an estimated value.

The load occurring cumulatively since the last bearing replacement is totaled through all current loads:

$$t_{Sum} = \Sigma_0^n t_{current}$$

The degree of utilization k of the bearings is calculated thus:

$$k = \frac{t_{Sum}}{L'_{10h}}$$

If value k reaches or exceed value 1, a notification may be issued that replace of antifriction bearing or bearings 135 is necessary. Otherwise, no remaining operating time can be given.

The remaining operating time of the bearing $t_{rem.bearing}$ calculates to:

$$t^{rem.bearing} = t_{op\ time\ so\ far} \cdot (1/k - 1)$$

Figure 7:
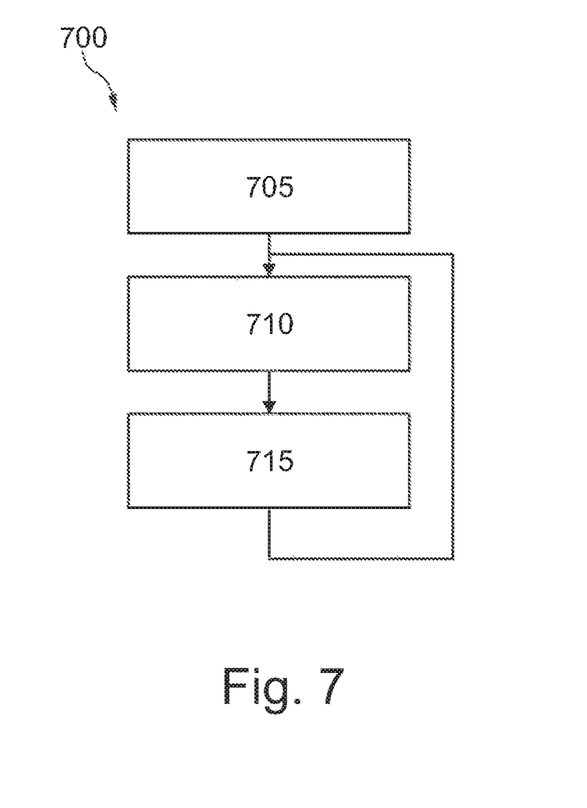
FIG. 7 a flow chart of a method for determining a time until the next possible ramp-acceleration of a hydrodynamic clutch.

In yet another embodiment, the time to the next possible acceleration of hydraulic clutch is determined.

FIG. 7 shows a flow diagram of a corresponding method 700. In an initialization step 705 one of the following may be determined: nominal speed $n_N$, a dimension, a type, filling with fluid 130 and an operating medium of clutch 105. A diameter can be used as the dimension. An actual or a projected volume of fluid 130 can be specified as the filling.

Subsequently, steps 710 and 715 are cycled through, either in a time controlled manner, for example every approx. 5 seconds or approx. 10 seconds, or in an event controlled manner. In step 710, temperature $\theta_{VTK}$ of fluid 130 and temperature $\theta_{amb}$ surrounding clutch 105 and drive speed $n_2$ may be determined. A required cooling period during which clutch 105 should be at a standstill before it starts again can be determined in step 715. The necessary minimum cooling period on the one hand depends on the temperature of the clutch at the time of shut-down, and the effective thermal capacity of the clutch, as well as the ambient temperature. Moreover, it can be provided that the load on the clutch during a restart is considered.

$$\Delta\theta_{start,min} = \theta_{VTK} - \theta_{VTK,start}$$

Where:

$\theta_{VTK,max,during\ run-up}$: max value of $\theta_{VTK}$ for: $0 < n_2 < ((\Delta n_1 \cdot 2 \cdot s^{-1})/n_1 N) < 0.001$ $\theta_{VTK,\ start}$: $\theta VTK$ if $n_2$ after min. approx. 30 s is again >0 for the first time Moreover, differentiation can be made $\Delta\theta_{start,min}$ after a load condition. The criterion can be that $n_2$ prior to shut-off $((\Delta n_1 \cdot 2 \cdot s^{-1})/n_1 N) < -0.001$ and median value $n_2$ approx. 5 s to approx. 10 s is taken from the following table prior to reaching this condition:

| | $\Delta\theta_{start,min}$ | | | |
|---|---|---|---|---|
| $1 * n_N\ n_2 \geq 0.995 * n_N$ | $0.995 * n_N > n_2 \geq 0.99 * n_N$ | $0.99 * n_N > n_2 \geq 0.985 * n_N$ | . . . . . . | $0.9 * n_N$ |
| . | . | . | | |
| . | . | . | | |
| FIFO-memory with i.e. 20 values | . | . | | |
| . | . | . | | |
| . | . | . | | |

The intervals created in the table for n2 are purely exemplary. Only the range of up to 10 percent slippage is considered, since this concerns the load evaluation prior to shutting off. A longer term operation of above 10 percent slippage is normally not possible, since this would threaten a thermal overload and based on its output side characteristics curve, the clutch could come to a short-term stand still.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION

100 Clutch system
105 hydrodynamic clutch
110 control unit
115 input side
120 output side
125 axis of rotation
130 fluid
135 antifriction bearing
140 seal
145 first interface
150 temperature sensor
155 second interface
160 terminal device
165 reservoir
200 method for determining a current fluid filling of a hydrodynamic clutch
205 sensing of temperature
210 determining thermal output
215 determining lambda-value K
220 determining degree of filling
300 method for determining a current filling in a hydrodynamic clutch with fluid, during stationary operation
305 initialization step
310 sensing of temperature
315 determining degree of filling
400 method for determining a power transferred via a hydrodynamic clutch
405 initialization step
410 operating medium
415
420 seal material of Viton
425
430
435
440

445 sensing of temperature
450 determining transferred power
500 method for determining a remaining life span of a fluid in a hydrodynamic clutch
505 initializing: determining type of fluid
510 sensing of temperature
515 determining current load value
520 adding up
525 determining degree of utilization
530 issuing possible notification
535 table—mineral oil
540 table—synthetic oil
600 method for determining a remaining life span of an antifriction bearing
605 initialization
610 first diagram
615 second diagram
620 sensing of temperature
625 determining the temperature factor
630 determining time ratio—start frequency
635 determining start frequency factor
640 determining slippage factor
645 determining life span
700 method for determining a time unto the next possible run up of a hydrodynamic clutch
705 initialization step
710 sensing of temperature
714 determining wait time

What is claimed is:

1. A method for determining a fill level of a hydrodynamic clutch with a hydraulic fluid, the clutch including an input side and an output side, rotational motions of the input side and the output side being coupled to one another by the hydraulic fluid, the method comprising the steps of:
   periodical sensing of a fluid temperature of the hydraulic fluid;
   determining a thermal output supplied to the clutch using the fluid temperature;
   determining a lambda value using the thermal output;
   determining the fill level using the lambda value; and
   determining a power supplied to the clutch, the step of determining the power supplied to the clutch including the sub-steps of:
      determining a maximum permissible temperature of the clutch;
      determining an ambient temperature of an area surrounding the clutch; and
      determining a power that is being transferred via the clutch using the fluid temperature and the ambient temperature.

2. The method according to claim 1, wherein the method includes the step of determining a remaining life span of the hydraulic fluid, the step of determining the remaining life span of the hydraulic fluid including:
   determining loads on the hydraulic fluid using the fluid temperature and the ambient temperature;
   determining a sum of the loads; and
   determining the remaining life span using the sum.

3. The method according to claim 1, wherein the method is carried out using a computer program running on a processor or stored on a computer-readable data medium having a program code.

4. A method for determining a fill level of a hydrodynamic clutch with a hydraulic fluid, the clutch including an input side and an output side, rotational motions of the input side and the output side being coupled to one another by the hydraulic fluid, the method comprising the steps of:
   periodical sensing of a fluid temperature of the hydraulic fluid;
   determining a thermal output supplied to the clutch using the fluid temperature;
   determining a lambda value using the thermal output;
   determining the fill level using the lambda value; and
   determining a remaining life span of an antifriction bearing for mounting of the input side relative to the output side, the step of determining the remaining life span of the antifriction bearing including the sub-steps of:
      determining loads on the antifriction bearing using the fluid temperature;
      determining a sum of the loads; and
      determining the remaining life span using the sum.

5. The method according to claim 4, further comprising a step of determining an increase in a speed differential of the antifriction bearing from a standstill to a rated speed thereby defining a start, and determining the remaining life span of the antifriction bearing dependent upon a frequency of the starts.

6. The method according to claim 4, further comprising a step of determining a slippage between the input side and the output side thereby defining a slippage factor, and calculating the remaining life span of the antifriction bearing dependent upon the slippage factor.

7. A control unit for determining an operating status of a hydrodynamic clutch, having an input side and an output side, rotational motions of the input side and the output side being coupled to one another by a hydraulic fluid, the control unit comprising:
   an interface for connecting with a temperature sensor equipped for periodic sensing of a temperature of the hydraulic fluid; and
   a processor arranged for determining a thermal output supplied to the clutch using the temperature of the hydraulic fluid, determining a lambda value using the thermal output, and determining a fill level using the lambda value
   the processor additionally executing a method that includes the step of determining a power supplied to the clutch, the step of determining the power supplied to the clutch including the sub-steps of:
   determining a maximum permissible temperature of the clutch;
   determining an ambient temperature of an area surrounding the clutch; and
   determining a power that is being transferred via the clutch using the fluid temperature and the ambient temperature.

8. A clutch system comprising:
   a hydrodynamic clutch having an input side and an output side, rotational motions of the input side and the output side being coupled to one another by a hydraulic fluid;
   a temperature sensor equipped for periodic sensing of a temperature of the hydraulic fluid; and
   a control unit for determining an operating status of the hydrodynamic clutch, the control unit comprising:
      an interface for connecting with the temperature sensor; and
      a processor arranged for determining a thermal output supplied to the clutch using the temperature of the hydraulic fluid, determining a lambda value using the thermal output, and determining a fill level using the lambda value;
   the processor additionally executing a method that includes the step of determining a power supplied to the clutch, the step of determining the power supplied to the clutch including the sub-steps of:

determining a maximum permissible temperature of the clutch;

determining an ambient temperature of an area surrounding the clutch; and determining a power that is being transferred via the clutch using the fluid temperature and the ambient temperature.

\* \* \* \* \*

UNITED STATES PATENT AND TRADEMARK OFFICE
CERTIFICATE OF CORRECTION

PATENT NO. : 11,118,637 B2
APPLICATION NO. : 16/283256
DATED : September 14, 2021
INVENTOR(S) : Hoffeld It is certified that error appears in the above-identified patent and that said Letters Patent is hereby corrected as shown below:

In the Specification

Column 6
At Line 17, please delete "$P = A \cdot \Delta\Theta/\Delta t$", and substitute therefore --$P = A \cdot \Delta\vartheta/\Delta t$--;
At Line 25, please delete "$\Delta\Theta/\Delta t$:", and substitute therefore --$\Delta\vartheta/\Delta t$:--;
At Line 27, please delete "$\Delta\Theta/\Delta t > 0.5 K/s$", and substitute therefore --$\Delta\vartheta/\Delta t > 0.5 K/s$--;
At Line 63, please delete "$\Theta_{VTK}$", and substitute therefore --$\vartheta_{VTK}$--; and
At Line 64, please delete "$\Theta_{amb}$", and substitute therefore --$\vartheta_{amb}$--.

Column 7
At Line 1, please delete "$P-\Delta\Theta^c$", and substitute therefore --$P - \Delta\vartheta^c$--;
At Line 14, please delete "$\Theta_{VTK}$", and substitute therefore --$\vartheta_{VTK}$--;
At Line 26, please delete "$\Theta_{VTK}$", and substitute therefore --$\vartheta_{VTK}$--; and
At Line 66, please delete "$\Theta_{max}$", and substitute therefore --$\vartheta_{max}$--.

Column 8
At Line 5, please delete "$\Theta_{B,max}$", and substitute therefore --$\vartheta_{B,max}$--;
At Line 9, please delete "$\Theta_{B,max}$", and substitute therefore --$\vartheta_{B,max}$--;
At Line 12, please delete "$\Theta_{B,max}$", and substitute therefore --$\vartheta_{B,max}$--;
At Lines 15, please delete "$\Theta_{B,max}$", and substitute therefore --$\vartheta_{B,max}$--;
At Line 16, please delete "$\Theta_{B,max}$", and substitute therefore --$\vartheta_{B,max}$--;
At Line 19, please delete "$\Theta_{VTK}$", and substitute therefore --$\vartheta_{VTK}$--;
At Line 20, please delete "$\Theta_{amb}$", and substitute therefore --$\vartheta_{amb}$--; and
At Line 29, please delete "$\Theta_{VTK}$", and substitute therefore --$\vartheta_{VTK}$--.

Column 9
At Line 8, please delete "$\Theta_{VTK}$", and substitute therefore --$\vartheta_{VTK}$--; and
At Line 19, please delete "$\Theta_{VTK}$", and substitute therefore --$\vartheta_{VTK}$--.

Signed and Sealed this
Nineteenth Day of September, 2023

Katherine Kelly Vidal
*Director of the United States Patent and Trademark Office*

CERTIFICATE OF CORRECTION (continued)
U.S. Pat. No. 11,118,637 B2

Column 10
At Line 20, please delete "$\Theta_{VTK}$", and substitute therefore --$\vartheta_{VTK}$--.

Column 11
At Line 44, please delete "$\Theta_{VTK}$", and substitute therefore --$\vartheta_{VTK}$--;
At Line 45, please delete "$\Theta_{amb.}$", and substitute therefore --$\vartheta_{amb.}$--;
At Line 55, please delete "$\Delta\Theta_{start,min} = \Theta_{VTK} - \Theta_{VTK, start}$", and substitute therefore --$\Delta\vartheta_{start,min} = \vartheta_{VTK} - \vartheta_{VTK, start}$--;
At Line 59, please delete "$\Theta_{VTK,max,during\ run-up}$: max value of $\Theta_{VTK}$ for:", and substitute therefore --$\vartheta_{VTK,max,during\ run-up}$: max value of $\vartheta_{VTK}$ for:--;
At Line 61, please delete "$\Theta_{VTK, start}$: $\Theta$VTK", and substitute therefore --$\vartheta_{VTK, start}$: $\vartheta$VTK--; and
At Line 63, please delete "$\Delta\Theta_{start,min}$", and substitute therefore --$\Delta\vartheta_{start,min}$--.

Column 12
At Line 51, please delete "lambda-value K", and substitute therefore --lambda-value $\lambda$--.